US008198858B2

(12) United States Patent
Kim et al.

(10) Patent No.: US 8,198,858 B2
(45) Date of Patent: Jun. 12, 2012

(54) MOBILE TERMINAL HAVING MENU PROVIDING FUNCTION FOR WIRELESS RECHARGING AND RECHARGING METHOD THEREOF

(75) Inventors: Min-Suk Kim, Seoul (KR); Won-Lee Park, Seoul (KR)

(73) Assignee: LG Electronics Inc., Seoul (KR)

( * ) Notice: Subject to any disclaimer, the term of this patent is extended or adjusted under 35 U.S.C. 154(b) by 768 days.

(21) Appl. No.: 12/333,677

(22) Filed: Dec. 12, 2008

(65) Prior Publication Data

US 2009/0156268 A1 Jun. 18, 2009

(30) Foreign Application Priority Data

Dec. 12, 2007 (KR) ........................ 10-2007-0129355

(51) Int. Cl.
*H02J 7/00* (2006.01)
*H04M 1/00* (2006.01)
*H01M 2/10* (2006.01)

(52) U.S. Cl. ........ 320/108; 320/106; 320/110; 320/125; 455/573; 429/99

(58) Field of Classification Search .................. 320/108
See application file for complete search history.

(56) References Cited

U.S. PATENT DOCUMENTS

| | | | |
|---|---|---|---|
| 6,501,949 B1 * | 12/2002 | Singleton ................. | 455/422.1 |
| 6,522,361 B2 * | 2/2003 | Higuchi et al. ............ | 348/372 |
| 6,522,902 B2 * | 2/2003 | Nishihara et al. ......... | 455/574 |
| 2003/0114206 A1 * | 6/2003 | Timothy et al. ........... | 455/575 |
| 2005/0099156 A1 * | 5/2005 | Brenner ..................... | 320/116 |
| 2005/0170827 A1 * | 8/2005 | Nagashima ................ | 455/419 |
| 2006/0284593 A1 * | 12/2006 | Nagy et al. ................ | 320/109 |
| 2007/0060100 A1 * | 3/2007 | Watler et al. .............. | 455/406 |

* cited by examiner

*Primary Examiner* — Yalkew Fantu

(74) *Attorney, Agent, or Firm* — Lee, Hong, Degerman, Kang & Waimey

(57) ABSTRACT

A mobile terminal is provided including a battery, an output unit, a memory, and a controller. The battery provides power. The output unit outputs a wireless recharge state. The memory stores recharge menus and recharge menu settings. The controller provides recharge menus for wireless recharging of the battery based on whether payment is required for the wireless recharging. The controller also performs a wireless recharging operation according to selection of the recharge menu settings.

19 Claims, 9 Drawing Sheets

FIG. 8
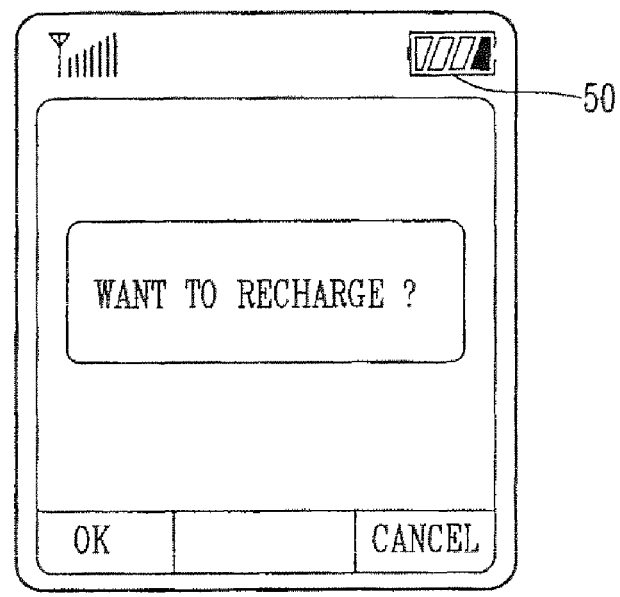
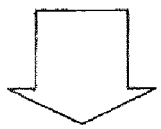
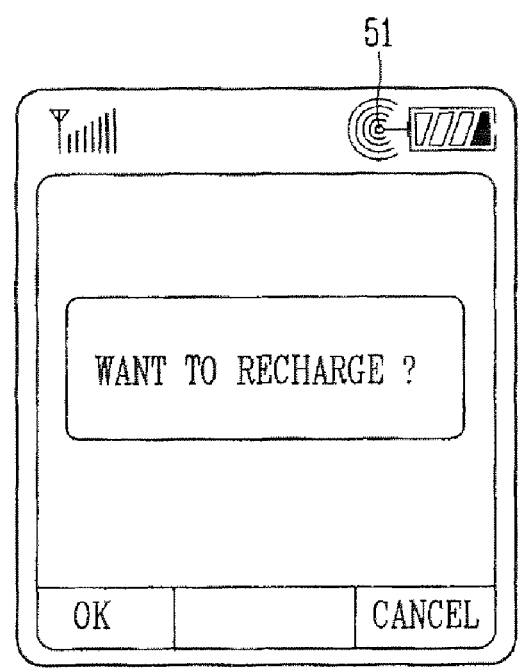

MOBILE TERMINAL HAVING MENU PROVIDING FUNCTION FOR WIRELESS RECHARGING AND RECHARGING METHOD THEREOF

CROSS-REFERENCE TO RELATED APPLICATIONS

Pursuant to 35 U.S.C. §119(a), this application claims the benefit of earlier filing date and right of priority to Korean Application No. 10-2007-0129355, filed on Dec. 12, 2007, the contents of which is incorporated by reference herein in its entirety.

FIELD OF THE INVENTION

The present invention relates to non-contacting recharging of a mobile terminal and, more particularly, to a mobile terminal and its wireless recharging method capable of enhancing user convenience and recharging efficiency by providing various menus for wireless recharging.

DESCRIPTION OF THE RELATED ART

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Recently, as users may now view videos or TV programs on mobile terminals through receiving broadcast or multicast signals, a large capacity battery is needed. A battery having an adequate capacity has not yet been developed. As a result, if the mobile terminal battery is not periodically charged or recharged during the video or TV program, users may not be able to watch an entire video or TV program via the mobile terminal.

Various recharging devices and relevant methods for recharging batteries have been developed. In order to recharge a mobile terminal battery, a recharging unit (e.g., a recharging body or a recharging device) may be connected with a general power source for supplying electric energy to the battery. The recharging unit and the battery include contact terminals on their outer surfaces, respectively, which are connected to selectively recharge the battery.

The presence of the contact terminals on the recharging unit and the battery is unattractive. Further, because the contact terminals are exposed to moisture, recharged energy is lost. In addition, the contact terminals may not be properly in contact with each other resulting in a failed recharging operation. In an effort to avoid such problems, a method for recharging the battery in a non-contact point manner (or in a non-contact/contactless manner), without configuring the contact terminals on the recharging unit and the battery (or secondary cell), has been proposed and used for some application fields.

The related art contactless recharging methods include a contactless recharging method using inductive coupling, a contactless recharging method using capacitance coupling, a wireless method for performing recharging using radio waves, and various other methods. The contactless recharging method using inductive coupling is a method in which a primary coil is provided in the recharging unit and a secondary coil is provided in a recharging target such as a terminal so that when the terminal approaches the recharging unit, the primary coil and the secondary coil are inductively coupled to recharge the terminal. The recharging method using the capacitance coupling is a method in which a load side plate conductor is provided in the terminal and a power side plate conductor is provided in the recharging unit and the load side plate conductor and the power side plate conductor are capacitance-coupled to recharge the terminal.

In the wireless method, an electromagnetism generator of a recharge power providing unit (e.g., a base station, a TV broadcast station, an artificial satellite, or other mobile wireless recharging unit) generates radio waves to generate an induction current in a mobile terminal to recharge its battery.

The contactless recharging methods known in the art do not provide a defined menu for contactless recharging or an operation method with respect to the menu. Thus, in order to perform contactless recharging, the user has limited options. In addition, if a user would like to address recharging options during a recharging operation, the user would have to stop or to terminate the recharging operation.

SUMMARY OF THE INVENTION

Accordingly, one object of the present invention is to address the above-noted and other problems. Another object of the present invention is to provide a mobile terminal and its wireless recharging method capable of satisfying user convenience and recharging efficiency by providing various wireless recharge menus.

In an exemplary embodiment of the present invention, a mobile terminal is provided including a battery, an output unit, a memory, and a controller. The battery provides power. The output unit output a wireless recharge state. The memory stores recharge menus and recharge menu settings. The controller configured to provide the recharge menus for wireless recharging of the battery based on whether payment is required for the wireless recharging and is configured to perform a wireless recharging operation according to selection of the recharge menu settings.

In one embodiment, the recharge menus are related to receiving recharge power from a recharge power providing unit wirelessly or are related to receiving recharge power from a wireless recharging unit according to an inductive coupling or a capacitance coupling.

In one embodiment, the recharge menus vary according to whether a payment is required if the recharge menus are related to receiving the recharge power wirelessly.

In one embodiment, the recharge menus include at least one of an automatic recharge menu or a recharge setting menu when battery recharging is required.

In one embodiment, the controller performs the wireless recharging operation to recharge the battery automatically if a battery voltage of the battery is lower than a reference voltage and an option for automatic recharging has been set.

In one embodiment, the controller provides a notification message visually or audibly if a battery voltage of the battery is lower than a reference voltage and an option for automatic recharging has been set.

In one embodiment, the recharge menus include at least one of inquiring whether to perform recharging, facilitating selection of the recharge power providing unit, facilitating selection of an amount of recharging, or facilitating selection of a recharge state informing method when payment is required to receive the recharge power.

In one embodiment, the recharge power providing unit includes a wireless power generator, a base station, a broadcast relay station, a repeater, an Internet sharer, an artificial satellite that wirelessly provides recharge power, or a portable wireless recharging unit that provides recharge power according to inductive coupling or capacitance coupling.

In one embodiment, the controller provides a notification message visually, audibly, or through vibration when the recharge power providing unit is positioned within a particular range of the mobile terminal.

In one embodiment, the recharge menus for wireless recharging of the battery are provided with the notification message.

In one embodiment, the controller informs a user about at least one of a wireless recharge state or an event during recharging.

In one embodiment, the wireless recharge state is displayed by a battery power indicator having a certain color, and the event comprises a degradation of recharge efficiency or the mobile terminal being close to being out of range of the recharge power providing unit.

In one embodiment, the wireless recharge state is displayed by a battery power indicator having a certain color, and the event comprises a degradation of recharge efficiency or the mobile terminal being out of range of the recharge power providing unit.

In one embodiment, the controller is further configured to display at least one of a recharge amount or a recharge state either visually or audibly. The recharge amount is displayed according to a fee, the number of battery indicator icons, or a recharge duration and the recharge state is indicated as a sound, a character, or an indicator.

In one embodiment, the indicator is a battery power indicator and the recharge level is indicated in a color.

In one embodiment, the controller displays an antenna indicator icon adjacent a battery power indicator and a recharge efficiency with a number of antenna lines when the recharge power providing unit is detected.

In one embodiment, the mobile terminal further includes a recharge power providing unit to wirelessly provide recharge power.

In one embodiment, the recharge power providing unit comprises an antenna for checking whether a mobile terminal is within range.

In one embodiment, recharge related information is provided to the mobile terminal when the mobile terminal is detected by the antenna.

In one embodiment, the controller is configured to check a battery capacity and is configured to control reception of recharge power from the recharge power providing unit if the battery capacity is lower than a certain value.

In one embodiment, the controller displays information provided by the recharge power providing unit on a display unit and provides a menu inquiring whether to receive recharge power from the recharge power providing unit if the battery capacity is lower than the certain value.

In an exemplary embodiment of the present invention, a method for recharging a battery in a mobile terminal is provided. The method includes determining whether a remaining battery capacity is below a certain level; providing recharge menus facilitating the setting of options related to recharging the battery, the recharge menus including an automatic recharge menu and a recharge setting menu; detecting settings of the automatic recharge menu or the recharge setting menu; receiving radio power from a recharge power providing unit; and performing a battery recharging operation according to settings of the automatic recharge menu or the recharge setting menu.

In one embodiment, a notification message is provided visually or audibly when the recharge setting menu has been set.

In one embodiment, the recharge menus include at least one of inquiring whether to perform recharging, facilitating selection of the recharge power providing unit, facilitating selection of an amount of recharging, or facilitating selection of a recharge state informing method when payment is required for recharging the battery.

In one embodiment, the method further includes displaying a menu inquiring whether to perform recharging when the recharging is free to the user.

In one embodiment, the amount of recharging is displayed as a usage fee, a number of battery indicator icons, or a recharge duration, and the recharge state is displayed as a sound, a character, or an indicator.

In one embodiment, the method further includes indicating at least one of a recharge state of the battery or an event during recharging.

In one embodiment, the method further includes terminating the battery recharging operation when the battery is recharged to a previously set level.

BRIEF DESCRIPTION OF THE DRAWINGS

FIG. 8 shows one example of a recharge menu displayed on a display unit as part of the method illustrated in FIG. 7.

DETAILED DESCRIPTION

The mobile terminal according to exemplary embodiments of the present invention will now be described in detail with reference to the accompanying drawings.

Figure 1:
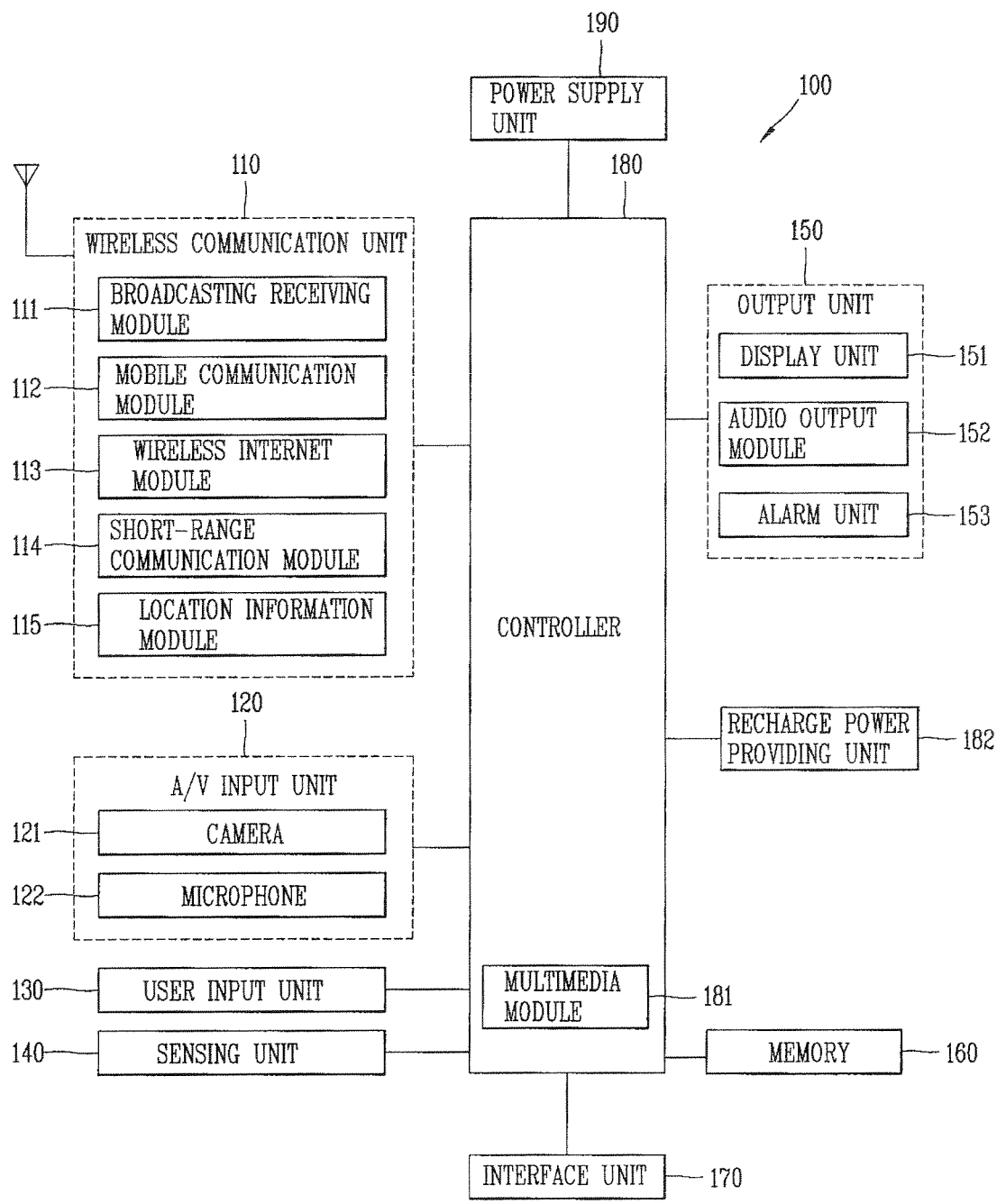
FIG. 1 is a schematic block diagram of a mobile terminal according to an exemplary embodiment of the present invention.

FIG. 1 is a block diagram of a mobile terminal 100 according to an exemplary embodiment of the present invention. The mobile terminal 100 may be implemented in various configurations. The mobile terminal 100 can be a mobile phone, a smart phone, a notebook computer, a digital broadcast terminal, a personal digital assistant (PDA), a portable multimedia player (PMP), a navigation device, or any other terminal device that provides functionality to a user.

The mobile terminal 100 as shown in FIG. 1 may include a wireless communication unit 110, an A/V (Audio/Video) input unit 120, a user input unit 130, a sensing unit 140, an output unit 150, a memory 160, an interface unit 170, a controller 180, and/or a power supply unit 190.

FIG. 1 shows the mobile terminal 100 having various components, but it is understood that implementing all of the illustrated components is not a requirement, as greater or fewer components may alternatively be implemented.

The wireless communication unit 110 typically includes one or more components allowing radio communication between the mobile terminal 100 and a wireless communication system or a network in which the mobile terminal 100 is located. For example, the wireless communication unit 110 may include a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server (or other network entity) via a broadcast channel. The broadcast channel may include a satellite channel and a terrestrial channel. The broadcast managing server may refer to a system that generates and transmits a broadcast signal and/or broadcast associated information or a server that receives a previously generated broadcast signal and/or broadcast associated information and transmits the signal/information to a terminal. Examples of the broadcast associated information may include information regarding a broadcast channel, a broadcast program, and a broadcast service provider. The broadcast signal may include a TV broadcast signal, a radio broadcast signal, and a data broadcast signal. The broadcast signal may further include a broadcast signal combined with a TV or radio broadcast signal.

The broadcast associated information may be provided via a mobile communication network (e.g., that operates according to standards such as 3GPP, 3GPP2, IEEE, CDMA, GSM, OMA, so-called 4G techniques) and, in this case, the broadcast associated information may be received by the mobile communication module 112.

The broadcast signal may have various forms. For example, it may have the form of an electronic program guide (EPG) of digital multimedia broadcasting (DMB) or an electronic service guide (ESG) of digital video broadcast-handheld (DVB-H).

The broadcast receiving module 111 may be configured to receive broadcast signals by using various types of broadcast systems. In particular, the broadcast receiving module 111 may receive a digital broadcast signal by using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), or integrated services digital broadcast-terrestrial (ISDB-T). The broadcast receiving module 111 is configured to be suitable for every broadcast system that provides a broadcast signal as well as the above-mentioned digital broadcast systems.

Broadcast signals and/or broadcast-associated information received via the broadcast receiving module 111 may be stored in the memory 160 (or other type of storage medium).

The mobile communication module 112 transmits and/or receives radio signals to and/or from at least one of a base station (e.g., access points, Node Bs), an external terminal (e.g., other user devices) and a server (or other network entities). Such radio signals may include a voice call signal, a video call signal, or various types of data according to text and/or multimedia message transmission and/or reception.

The wireless Internet module 113 supports Internet access for the mobile terminal 100. This module may be internally or externally coupled to the terminal. The short-range communication module 114 refers to a module for supporting short range communications. Some examples of short-range communication technology include Bluetooth™, Radio Frequency Identification (RFID), Infrared Data Association (IrDA), Ultra-WideBand (UWB), and ZigBee™.

The location information module 115 is a module for checking or acquiring a location (or position) of the mobile terminal 100. For example, the location information module 115 may be implemented using a GPS (Global Positioning System) module that receives location information from a plurality of satellites.

The location information may include coordinate information represented by latitude and longitude values. For example, the GPS module may measure an accurate time and distance from three or more satellites, and accurately calculate a current location of the mobile terminal 100 according to trigonometry based on the three different distances.

A method of acquiring distance and time information from three satellites and performing error correction with a single satellite may be used. In particular, the GPS module may acquire an accurate time together with three-dimensional speed information as well as the location of the latitude, longitude, and altitude values from the location information received from the satellites.

The A/V input unit 120 is configured to receive an audio or video signal. The A/V input unit 120 may include a camera 121 or other image capture device and a microphone 122 or other sound pick-up device. The camera 121 processes image data of still pictures or videos obtained in a video capturing mode or an image capturing mode. The processed image frames may be displayed on a display unit 151 or other visual output device.

The image frames processed by the camera 121 may be stored in the memory 160 or other storage medium or transmitted via the wireless communication unit 110. Two or more cameras 121 may be provided according to the configuration of the mobile terminal 100.

The microphone 122 may receive sounds (audible data) via a microphone in a phone call mode, a recording mode, or a voice recognition mode, and can process such sounds into audio data. The processed audio (voice) data may be converted for output into a format transmittable to a mobile communication base station or other network entity via the mobile communication module 112 in the phone call mode. The microphone 122 may include various types of noise canceling or suppression algorithms to cancel or suppress noise or interference generated in the course of receiving and transmitting audio signals.

The user input unit 130 or other user input device may generate key input data from commands entered by a user to control various operations of the mobile terminal 100. The user input unit 130 allows the user to enter various types of information, and may include a keypad, a dome switch, a touch pad (e.g., a touch sensitive member that detects changes in resistance, pressure, or capacitance), a jog wheel, and/or a jog switch. In particular, a touch screen may be implemented by overlapping the touch pad on the display unit 151 in a layered manner.

The sensing unit 140 or other detection means detects a current status or state of the mobile terminal such as an opened or closed state of the mobile terminal, a location of the mobile terminal, a presence or absence of user contact (i.e., touch inputs) with the mobile terminal, orientation of the mobile terminal, and an acceleration or deceleration movement and direction of the mobile terminal. The sensing unit 140 also generates commands or signals for controlling the operation of the mobile terminal 100. For example, when the mobile terminal 100 is a slide type mobile phone, the sensing unit 140 may sense whether the slide phone is opened or closed. In addition, the sensing unit 140 can detect whether the power supply unit 190 supplies power or whether the interface unit 170 is coupled with an external device.

The interface unit 170 or other connection means serves as an interface with at least one external device connected with the mobile terminal 100. For example, external devices may include wired or wireless headset ports, external power supply or battery recharger ports, wired or wireless data ports, memory card ports, ports for connecting a device having an identification module, audio input/output (I/O) ports, video I/O ports, or earphone ports.

The identification module may be a chip, a smart card, or other element with memory or storage capabilities that stores various information for authenticating the authority to use the mobile terminal 100 and may include a user identity module (UIM), a subscriber identity module (SIM), or a universal subscriber identity module (USIM). The interface unit 170 may be used to receive inputs (e.g., data, information, power) from an external device and transfer the received inputs to one or more elements within the mobile terminal 100 or may be used to transfer data between the mobile terminal and an external device.

The output unit 150 is configured to provide outputs in a visual, audible, and/or tactile manner (e.g., audio signal, video signal, alarm signal, vibration signal). The output unit 150 may include the display unit 151, an audio output module 152, and an alarm unit 153.

The display unit 151 may output information processed in the mobile terminal 100. For example, when the mobile terminal 100 is in a phone call mode, the display unit 151 may display a user interface (UI) or a graphic user interface (GUI) associated with a call or other communication (such as text messaging, multimedia file downloading). When the mobile terminal 100 is in a video call mode or image capturing mode, the display unit 151 may display a captured image and/or received image, or a UI or GUI that shows videos or images and related functions.

When the display unit 151 and the touch pad are overlaid in a layered manner to form a touch screen, the display unit may function as both an input device and an output device. The display unit 151 may include at least one of a Liquid Crystal Display (LCD), a Thin Film Transistor-LCD (TFT-LCD), an Organic Light Emitting Diode (OLED), a flexible display, or a three-dimensional (3D) display. The mobile terminal 100 may include two or more display units or other display means. For example, the mobile terminal 100 may include an external display unit that can be viewed even if the mobile phone is closed and an internal display unit that can be viewed if the mobile phone is opened.

The audio output module 152 may output audio data received from the wireless communication unit 110 or stored in the memory 160 in a call signal reception mode, a call mode, a record mode, a voice recognition mode, or a broadcast reception mode. The audio output module 152 may also provide audible outputs related to a particular function (e.g., a call signal reception sound, a message reception sound) performed by the mobile terminal 100. The audio output module 152 may include a speaker, a buzzer, or other sound generating device.

The alarm unit 153 or other type of user notification means may provide outputs to indicate an occurrence of an event of the mobile terminal 100. Typical events may include call reception, message reception, and key or button inputs. In addition to audio or video outputs, the alarm unit 153 may provide outputs in a different manner to indicate an occurrence of an event.

For example, the alarm unit 153 may provide outputs in the form of vibrations or other tactile outputs. When a call, a message, or some other incoming communication is received, the alarm unit 153 may provide tactile outputs (i.e., vibrations) to inform the user. Via these tactile outputs, the user can recognize the occurrence of various events even if his mobile phone is in his pocket. Outputs informing about the occurrence of an event may be also provided via the display unit 151 or the audio output module 152.

The memory 160 or other storage means may store software programs used for the processing and controlling operations performed by the controller 180, or may temporarily store data (e.g., a phonebook, messages, still images, video) that have been input or are to be output.

The memory 160 may include at least one type of storage medium including a flash memory, a hard disk, a multimedia card, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM) magnetic memory, a magnetic disk, and an optical disk. The mobile terminal 100 may cooperate with a network storage device that performs the storage function of the memory 160 over a network connection.

The controller 180 such as a microprocessor typically controls the general operations of the mobile terminal 100. For example, the controller 180 performs control and processing associated with voice calls, data communications, and video calls. In addition, the controller 180 may include a multimedia module 181 for reproducing or playing back multimedia data. The multimedia module 181 may be located within the controller 180 or may be located separate from the controller 180.

The power supply unit 190 receives external power via a power cable connection or internal power via the battery of the mobile phone and supplies appropriate power required for operating respective elements and components under the control of the controller 180.

Various embodiments described herein may be implemented in a computer-readable medium using, for example, computer software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform the functions described herein. In some cases, such embodiments may be implemented in the controller 180.

For a software implementation, procedures or functions may be implemented together with separate software modules that allow performing of at least one function or operation. Software codes can be implemented by a software application (or program) written in any suitable programming language. The software codes may be stored in the memory 160 and executed by the controller 180.

The mobile terminal 100 has been described from the perspective of its functions. Hereinafter, external elements of the mobile terminal will be described from the perspective of their functions with reference to FIG. 2 and FIG. 3. The mobile terminal 100 may be implemented in a variety of different configurations. Examples of such configurations include folder-type, bar-type, swing-type, a slide type, as well as various other configurations.

The following description will primarily relate to a slide-type mobile terminal. However, such description can equally apply to other types of mobile terminals.

Figure 2:
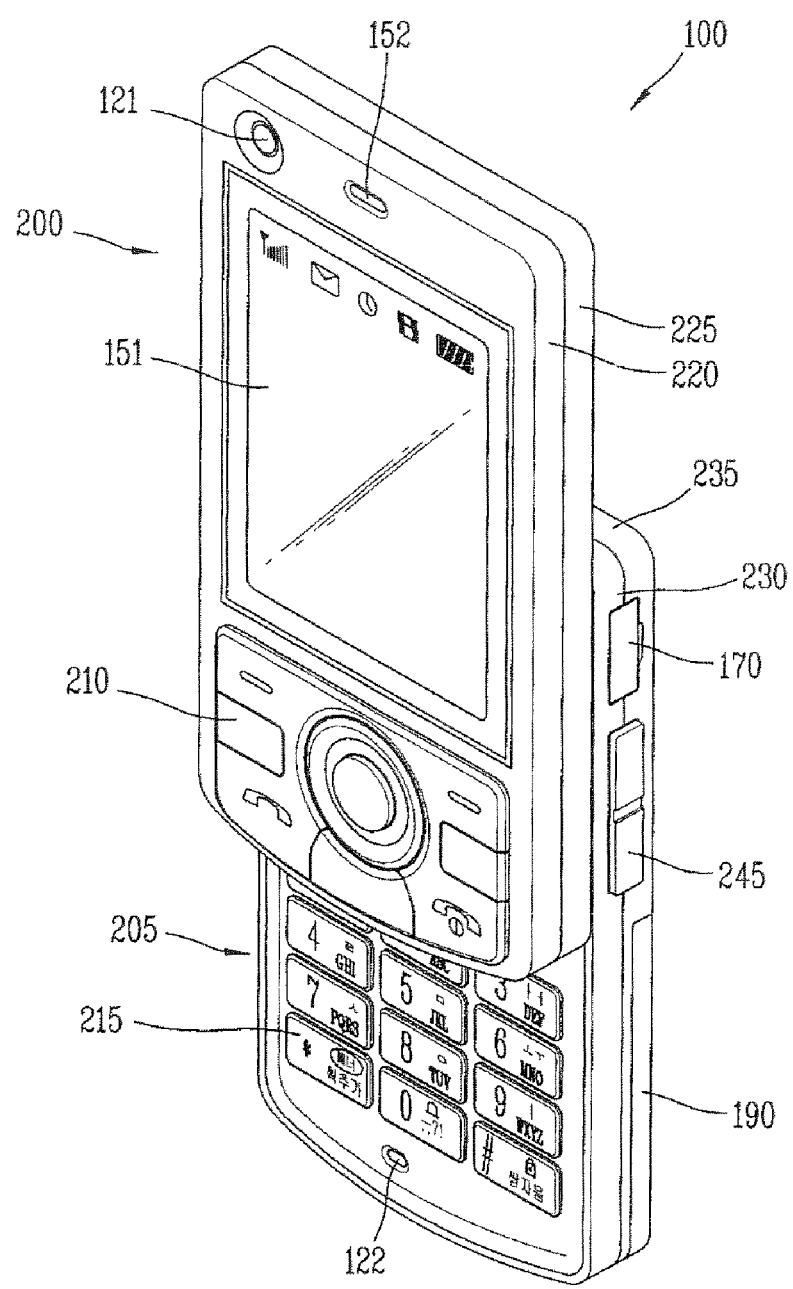
FIG. 2 is a front perspective view of the mobile terminal according to an exemplary embodiment of the present invention.

FIG. 2 is a front perspective view of the mobile terminal 100 according to an exemplary embodiment of the present invention. The mobile terminal 100 may include a first body 200 and a second body 205 that can be slidably moved with respect to each other in at least one direction. In case of the folder type mobile phone, the mobile terminal 100 includes a second body that can be folded or unfolded with respect to the first body.

A state in which the first body 200 is disposed to overlap the second body 205 may be called a closed configuration, and as shown in FIG. 2, a state in which at least a portion of the second body 205 is exposed may be called an open configuration. In the closed configuration, the mobile terminal mainly operates in a standby or idle mode, and the standby mode may be released upon user manipulation. The mobile terminal 100 operates mainly in the calling mode in the open configuration, and it can be changed to the standby mode with a lapse of time or upon user manipulation.

The case, casing, housing, or cover constituting the external appearance of the first body 200 may include a first front case 220 and a first rear case 225. Various electronic components are installed in the space between the first front case 220 and the first rear case 225. One or more intermediate cases may be additionally disposed between the first front case 220 and the first rear case 225. The cases may be formed by injection-molding a synthetic resin or may be made of a metallic material such as stainless steel (STS) or titanium (Ti).

The display unit 151, the audio output module 152, the camera 121, or the first user input unit 210 may be located on the first body 200, specifically, on the first front case 220 of the first body 200. The display unit 151 may include an LCD (Liquid Crystal Display) or an OLED (Organic Light Emitting Diode) display that visually displays information. A touch pad may be overlaid in a layered manner on the display unit 151 to allow the display unit to function as a touch screen to input information via a user's touch.

The audio output unit 152 may be implemented in the form of a speaker or other sound producing device. The camera 121 may be implemented to be suitable for capturing images or video with respect to the user and other objects.

Like the first body 200, the case constituting the external appearance of the second body 205 may include a second front case 230 and a second rear case 235. A second user input unit 215 may be located on a front portion of the second body 205, specifically, on the second front case 230. A third user input unit 245, the microphone 122, and the interface unit 170 may be located on at least one of the second front case 230 and the second rear case 235.

The first to third user input units 210, 215 and 245 are part of the user input unit 130 and may be generally referred to as a manipulating unit. Various methods and techniques can be employed for the manipulation unit so long as they can be operated by the user in a tactile manner.

For example, the user input unit 130 can be implemented as a dome switch, an actuator, or touch pad region that can receive user commands or information according to the user's touch operations (e.g., pressing, pushing, swiping, drag-and-drop) or may be implemented in the form of a rotatable control wheel or disc, keys or buttons, a jog dial, or a joystick.

The first user input unit 210 is used for inputting (entering) commands such as start, end, and scroll, and the second user input unit 215 is used for inputting (entering) numbers, characters, and symbols. The third user input unit 245 may support the hot key functions that allow more convenient activation of particular functions for the mobile terminal 100. The microphone 122 or other sound pick-up device may be implemented to detect user voice inputs and other sounds.

The interface unit 170 may be used as a communication link, passage, or path through which the mobile terminal 100 can exchange data with an external device. For example, the interface unit 170 may be implemented in the form of a connection port for connecting an earphone to the mobile terminal via a fixed or wireless means, a port for short-range communications (e.g., an Infrared Data Association (IrDA) port, a Bluetooth™ port, a wireless LAN port), or power supply ports for providing power to the mobile terminal. The interface unit 170 may be a card socket for accommodating a SIM (Subscriber Identification Module) card, a UIM (User Identity Module) card, or an external card such as a memory card for storing information.

The power supply unit 190 for supplying power to the mobile terminal 100 may be located on the second rear case 235. The power supply unit 190 may be a rechargeable battery that can be detached.

Figure 3:
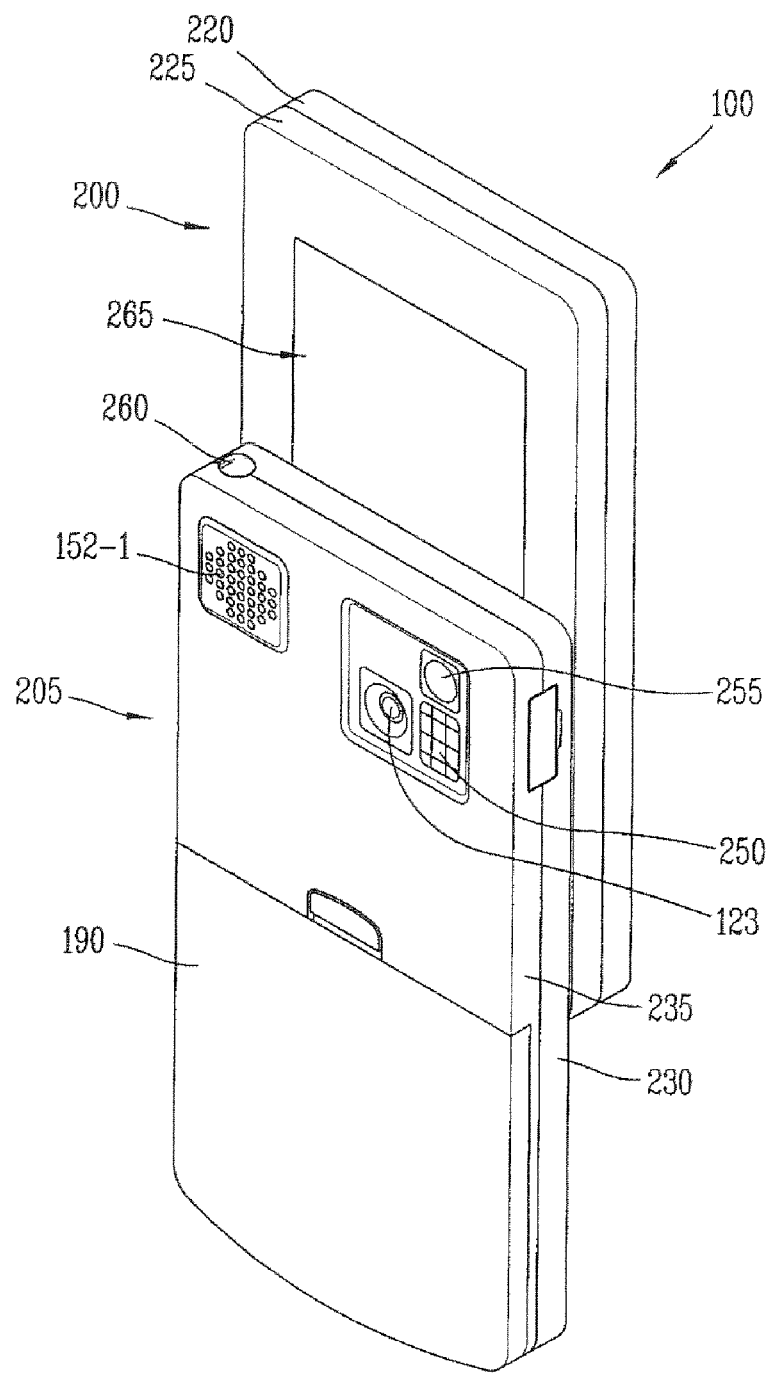
FIG. 3 is a rear view of the mobile terminal in FIG. 2.

FIG. 3 is a rear perspective view of the mobile terminal 100 of FIG. 2 according to an exemplary embodiment. As shown in FIG. 3, a camera 123 or other image capture device may additionally be located on a rear surface of the second rear case 235 of the second body 205. The camera 123 of the second body 205 may have an image capture direction which is substantially opposite to that of the camera 121 of the first body 200. Specifically, the two cameras 121, 123 may be implemented to face towards opposing directions, such as front and rear, and may support a different number of pixels (i.e., have a different resolution) than the camera 121 of the first body.

For example, the camera 121 of the first body 200 may operate with a relatively lower resolution to capture an image(s) of a user's face and immediately transmit such image(s) to another party in real-time during video call communication in which reverse link bandwidth capabilities may be limited. The camera 123 of the second body 205 may operate with a relatively higher resolution to capture images of general objects with high picture quality, which may not require immediate transmission in real-time, but may be stored for later viewing or use.

Additional camera related components, such as a flash 250 and a mirror 255, may be additionally located adjacent to the camera 123. When an image of the subject is captured with the camera 123 of the second body 205, the flash 250 illuminates the subject. The mirror 255 allows the user to see himself when he wants to capture his own image (i.e., self-image capturing) by using the camera 123 of the second body 205.

The second rear case 235 may further include an audio output module 152-1. The audio output module 152-1 may support stereophonic sound functions in conjunction with the audio output module 152 of the first body 200 and may also be used for sending and receiving calls in a speaker phone mode.

A broadcast signal receiving antenna 260 may be located externally or internally on one side or region of the second rear case 235, in addition to an antenna that is used for mobile communications. The antenna 260 can also be configured to be retractable from the second body 205.

One portion of a slide module 265 that allows the first body 200 and the second body 205 to slide relative to each other may be located on the first rear case 225 of the first body 200. The other portion of the slide module 265 may be located on the second front case 230 of the second body 205, which may not be exposed as shown in FIG. 3.

The second camera 123 and other components may be located on the second body 205, but this configuration is not meant to be limiting. For example, one or more of the elements (e.g., 260, 123, 250, and 152-1), which are illustrated as located on the second rear case 235 may be located on the first body 200, specifically, on the first rear case 225. In this case, those elements disposed on the first rear case 225 can be protected or covered by the second body 205 in the closed configuration. In addition, even if a separate camera is not provided on the second body, the camera module 123 may be configured to rotate or otherwise be moved to allow image capturing in various directions.

The mobile terminal 100 as shown in FIGS. 1 to 3 may be configured to operate with a communication system, which transmits data via frames or packets, such as wired and wireless communication systems, as well as satellite-based communication systems. The communication systems with which the mobile terminal 100 can operate will now be described with reference to FIG. 4.

The communication systems may use different air interfaces and/or physical layers. For example, air interfaces utilized by the communication systems include frequency division multiple access (FDMA), time division multiple access (TDMA), code division multiple access (CDMA), and universal mobile telecommunications system (UMTS) (in particular, long term evolution (LTE)), and global system for mobile communications (GSM). As a non-limiting example, the description hereafter relates to a CDMA communication system, but such teachings apply equally to other types of systems.

Figure 4:
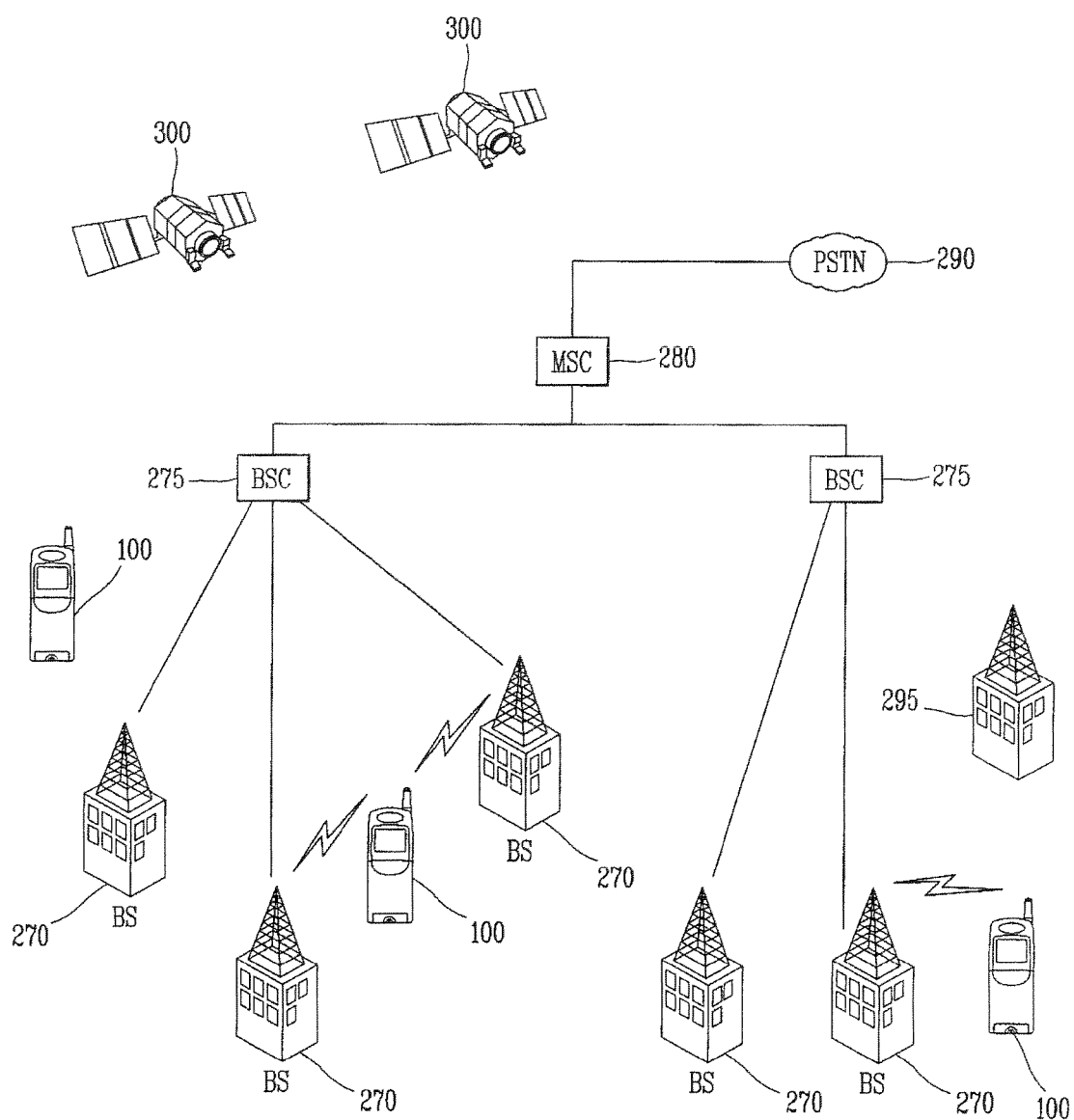
FIG. 4 is a block diagram of a wireless communication system operable with the mobile terminal according to an exemplary embodiment of the present invention.

Referring to FIG. 4, a CDMA wireless communication system may include a plurality of mobile terminals 100, a plurality of base stations (BSs) 270, base station controllers (BSCs) 275, and a mobile switching center (MSC) 280. The MSC 280 is configured to interface with a public switch telephone network (PSTN) 290. The MSC 280 is also configured to interface with the BSCs 275, which may be coupled to the BSs 270 via backhaul lines. The backhaul lines may be configured in accordance with any of several known interfaces including, for example, E1/T1, ATM, IP, PPP, Frame Relay, HDSL, ADSL, or xDSL. It is to be understood that the system as shown in FIG. 4 may include a plurality of BSCs 275.

Each BS 270 may serve one or more sectors or regions with each sector covered by an omni-directional antenna or an antenna pointed in a particular direction radially away from the BS 270. Alternatively, each sector may be covered by two or more antennas for diversity reception. Each BS 270 may be configured to support a plurality of frequency assignments, and each frequency assignment has a particular spectrum (e.g., 1.25 MHz, 5 MHz).

The intersection of a sector and frequency assignment may be referred to as a CDMA channel. The BS 270 may also be referred to as base station transceiver subsystems (BTSs) or other equivalent terms. The term "base station" may be used to collectively refer to a single BSC 275 and at least one BS 270. The base station may also be referred to as a "cell site." Alternatively, individual sectors of a particular BS 270 may be referred to as a plurality of cell sites.

As shown in FIG. 4, a broadcasting transmitter (BT) 295 transmits a broadcast signal to the mobile terminals 100 operating within the system. The broadcast receiving module 111 as shown in FIG. 1 is provided at the terminal 100 to receive broadcast signals transmitted by the BT 295.

In FIG. 4, several global positioning systems (GPS) satellites 300 are shown. The satellites 300 help locate at least one of a plurality of terminals 100. In FIG. 4, two satellites 300 are depicted, but it is understood that useful positioning information may be obtained with any number of satellites.

The GPS module 115 as shown in FIG. 1 is typically configured to cooperate with the satellites 300 to obtain desired positioning information. Instead of or in addition to GPS tracking techniques, other technologies that may track the location of the mobile terminals may be used. In addition, at least one of the GPS satellites 300 may selectively or additionally handle satellite DMB transmissions.

As one typical operation of the wireless communication system, the BSs 270 receive reverse-link signals from various mobile terminals 100. The mobile terminals 100 are typically engaging in calls, messaging, and other types of communications. Each reverse-link signal received by a particular base station 270 is processed within the particular BS 270. The resulting data is forwarded to an associated BSC 275.

The BSC 275 provides call resource allocation and mobility management functionality including the coordination of soft handoff procedures between BSs 270. The BSCs 275 also route the received data to the MSC 280, which provides additional routing services for interfacing with the PSTN 290. Similarly, the PSTN 290 interfaces with the MSC 280, the MSC interfaces with the BSCs 275, and the BSCs 275 in turn control the BSs 270 to transmit forward-link signals to the mobile terminals 100.

Exemplary embodiments of the present invention provide a recharging method which may vary depending on recharging situations. When a power level of the battery of the mobile terminal 100 is below a certain level, recharging may be requested in the mobile terminal to increase the power level and recharging may be stopped once the power level sufficiently increases. If there is no limitation when a mobile station may engage in a recharging operation, recharging may be performed whenever the mobile terminal approaches a recharge power providing unit or recharger.

The recharge menus according to exemplary embodiments of the present invention will now be described. The recharge menus may vary depending on whether a user is billed or pays a fee for the recharging service.

For example, when a recharge power providing unit located in a personal area is in use to recharge the mobile terminal, a fee is not paid, and the mobile terminal 100 informs the user only about a recharge range, a recharge efficiency, and a recharge state. However, when recharging in a public area, a fee is charged because the user does not use personal recharge power. When a fee is charged, the mobile terminal 100 asks the user whether to recharge or informs the user about a rate (i.e., cost for the recharge), a recharge amount (i.e., a recharge power level), and a recharge state.

The menus and recharging methods that may be selected by the user related to whether the user would like to recharge the power supply unit 190 will now be described. According to exemplary embodiments of the present invention, the wireless recharging menus are different depending on whether the user pays to recharge the power supply unit 190. The wireless recharging menus may also be different depending on whether recharging is requested by the mobile terminal 100 and whether recharging is unilaterally provided by a recharge power providing unit.

A proper recharge menu is provided to the user according to the type of wireless recharging. In addition, wireless recharging is performed according to user settings. The recharge menu includes a menu for wirelessly receiving recharge power from one of a radio power generator, a base station, a broadcast repeater station, a repeater (e.g., WiBro™, Wireless LAN), an Internet sharer, or a satellite and a menu for receiving recharge power from a wireless recharging unit according to an inductive coupling or a capacitance coupling.

Referring to FIG. 1, the broadcast receiving module 111 and the mobile communication module 112 may receive microwave signals for wireless recharging. In addition, the short-range communication module 114 may receive microwave signals for wireless recharging from a nearby wireless recharging device, and the location information module 115 may receive microwave signals for wireless recharging from a particular artificial satellite.

The wireless communication unit 110 receives microwave signals for wireless recharging from a recharge power providing unit, and converts the microwave signals into electronic signals. The recharge power providing unit includes a wireless power generator or wireless transmission unit, a base station, a broadcast repeater station, a repeater (e.g., WIBRO™, WLAN), an Internet sharer, and an artificial satellite.

The user input unit 130 allows the user to control the operation of the mobile terminal 100 and to set a menu for wireless recharging, and generates input data for controlling the operation of wireless recharging in a particular menu.

The display unit 151 may display various recharge menus regarding a recharging method, whether to perform recharging, a rate/cost for the recharging, the amount of recharging (e.g., 25%, 50%), and the recharging status.

The audio output module 152 may provide audible outputs related to a wireless recharging function such as notification about whether to perform recharging, the amount of recharging, a change in recharging efficiency, initiation of recharging, and stopping of recharging.

The alarm unit 153 or other type of user notification means may provide not only a signal to inform about an occurrence of an event of the mobile terminal 100, but also a signal about an event occurring during a recharging operation. Typical recharging events that may occur in the mobile terminal 100 may include a request for recharging from a system and a change in recharge efficiency. In addition to audio or video outputs, the alarm unit 153 may provide outputs in a different manner to inform about an occurrence of an event. For example, the alarm unit 153 may provide outputs in the form of vibrations or other tactile outputs.

The memory 160 or other storage means may temporarily store data such as a recharge menu, a recharge range set by the user in the corresponding recharge menu, a recharge time, whether to perform billing, a recharge notification type, or a transmission source selection that have been input or are to be output.

The controller 180 typically controls the general operations of the mobile terminal and also performs controlling and processing to perform wireless recharging. The power supply unit 190 (referred to as 'battery' hereinafter) is recharged by microwave signals transmitted from the recharge power providing unit. Thus, the mobile terminal 100 and a recharge power providing unit 182 may be combined to configure a single wireless recharging device.

The wireless recharging method in the mobile terminal constructed as described above will now be explained. Wireless recharging may be categorized into free recharging and cost-based recharging.

Free recharging refers to recharging without payment, which is recharging performed at a location where payment is not required, such as at home or in the office. As mentioned previously, the free recharging procedure can be categorized into recharging performed via a recharge power providing unit and recharging performed according to a request from the terminal.

The recharge power providing unit is a device for wirelessly providing recharge power. The recharge power providing unit includes a wireless power generator or wireless transmission unit, a base station, a broadcast repeater station, a repeater (e.g., WiBro™, WLAN), an Internet sharer, or an artificial satellite.

The recharge power providing unit includes an antenna or other detector means that is used to detect whether a mobile terminal 100 is located nearby. When a mobile terminal 100 is detected within the proximity of the recharge power providing unit, information related to providing recharge power (e.g., a power source, whether to perform recharging) is provided to the mobile terminal 100, which then informs the user about the information via its display unit 150, such as in a menu format on a display screen.

Accordingly, the controller 180 checks whether the battery capacity is lower than a certain value, and if so, the controller provides control to display the corresponding information on the display unit 150, detects a user selection regarding whether recharge power should be received from the recharge power providing unit, and then can receive recharge power from the recharge power providing unit. These procedures are also performed in basically the same manner when fee-based recharging is to be performed.

Figure 5:
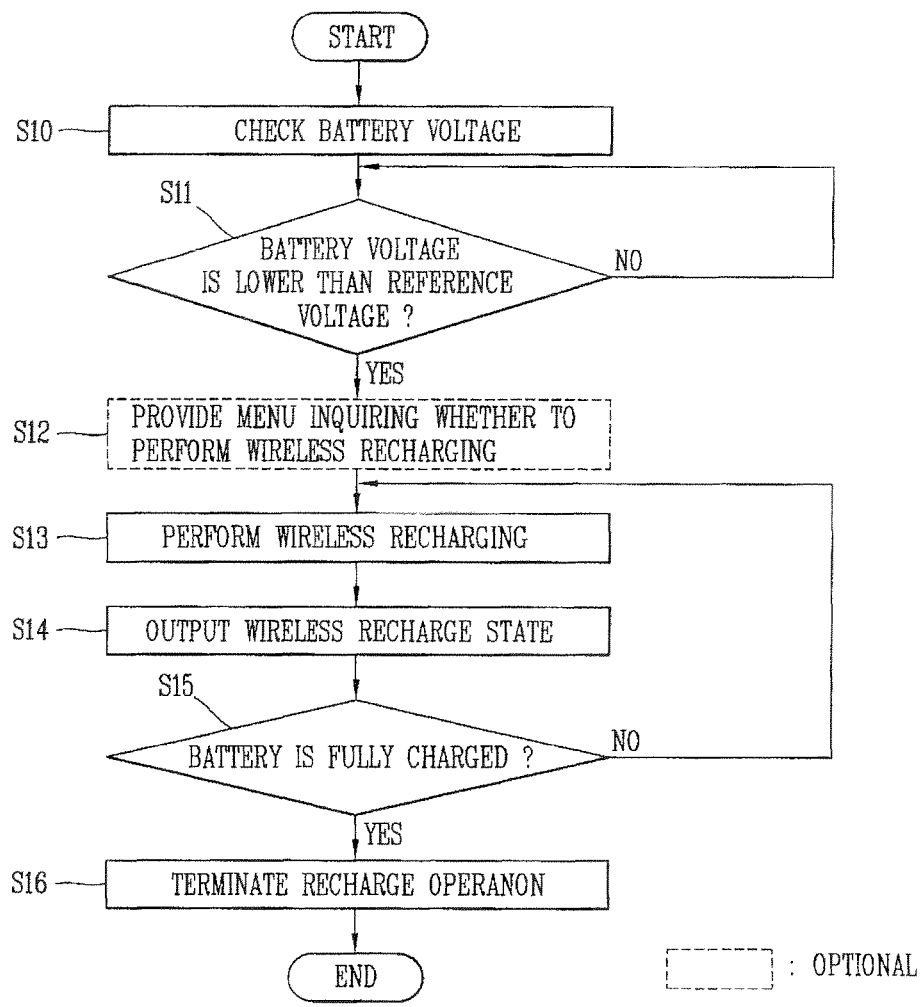
FIG. 5 is a flow chart illustrating a process of a recharging method for free recharging by a system according to an exemplary embodiment of the present invention.

FIG. 5 is a flow chart illustrating the process of a recharging method for free recharging by a system according to an exemplary embodiment of the present invention. The recharge power providing unit constantly outputs microwave signals or radio waves to recharge the mobile terminal 100. If the user is home or in an office, the controller 180 periodically checks battery power and compares a battery voltage to a reference voltage (S10, S11).

Figure 6:
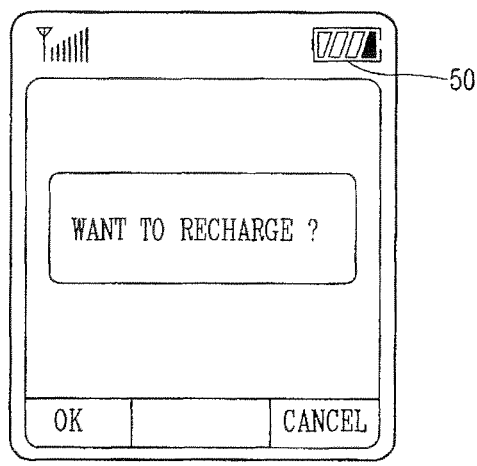
FIG. 6 shows one example of a recharge menu displayed on a display unit in FIG. 5.

If the battery voltage is lower than the reference voltage, as shown in FIG. 6, the controller 180 controls the display unit 151 to display an automatic recharge menu or other graphic indication which indicates that recharging is to be performed automatically or to display a recharge setting menu or other graphic indication to inform the user that recharging should be performed.

If recharging is required, the controller 180 can control the display unit 151 to display a menu that sets an automatic recharging procedure to be performed or to display a menu that provides a message inquiring whether to perform wireless recharging (e.g., 'Want to recharge?') on the screen of the display unit 151, to thereby inform the user about the necessity of recharging (S12). A remaining battery capacity can be displayed by using different colors together with an indicator 50 of battery power on the screen of the display unit 151.

The user may then select the 'OK' key or 'Cancel' key from the recharge menu to select automatic recharging or to perform recharging. If automatic recharging has been set to be performed when the battery voltage is lower than a reference voltage, the controller 180 provides control to recharge the battery. If recharging is performed, the controller 180 provides control to convert microwave signals received from the recharge power providing unit into an electrical signal to recharge the battery (S13) and provides a notification message in a visual or audible manner. Alternatively, the notification message may also be provided through a vibration.

While recharging is performed, the controller 180 displays a recharge state with the battery power indicator 50 in a certain color on the display unit 151 (S14). If a particular situation occurs, such as a recharge efficiency degradation or if the mobile terminal 100 moves beyond or close to moving beyond a range of the recharge power providing unit, the controller 180 informs the user about the situation by using the display unit 151, the audio output module 152, and/or the alarm unit 153. That is, the controller 180 informs the user about the degraded efficiency or movement or possible movement out of range through characters, sound, or vibration.

The mobile terminal 100 checks whether the battery is fully recharged (S15). When recharging is completed, the controller displays the battery power indicator 50 in a fully-charged state in a certain color and terminates the wireless recharging operation (S16).

In a different embodiment, when recharging is performed by the recharge power providing unit, if the battery voltage is lower than the reference voltage, the controller 180 may immediately perform wireless recharging (S13), without inquiring whether to perform wireless recharging (S12) as indicated in FIG. 5 by the dotted lines. This may be changed according to a user setting.

Figure 7:
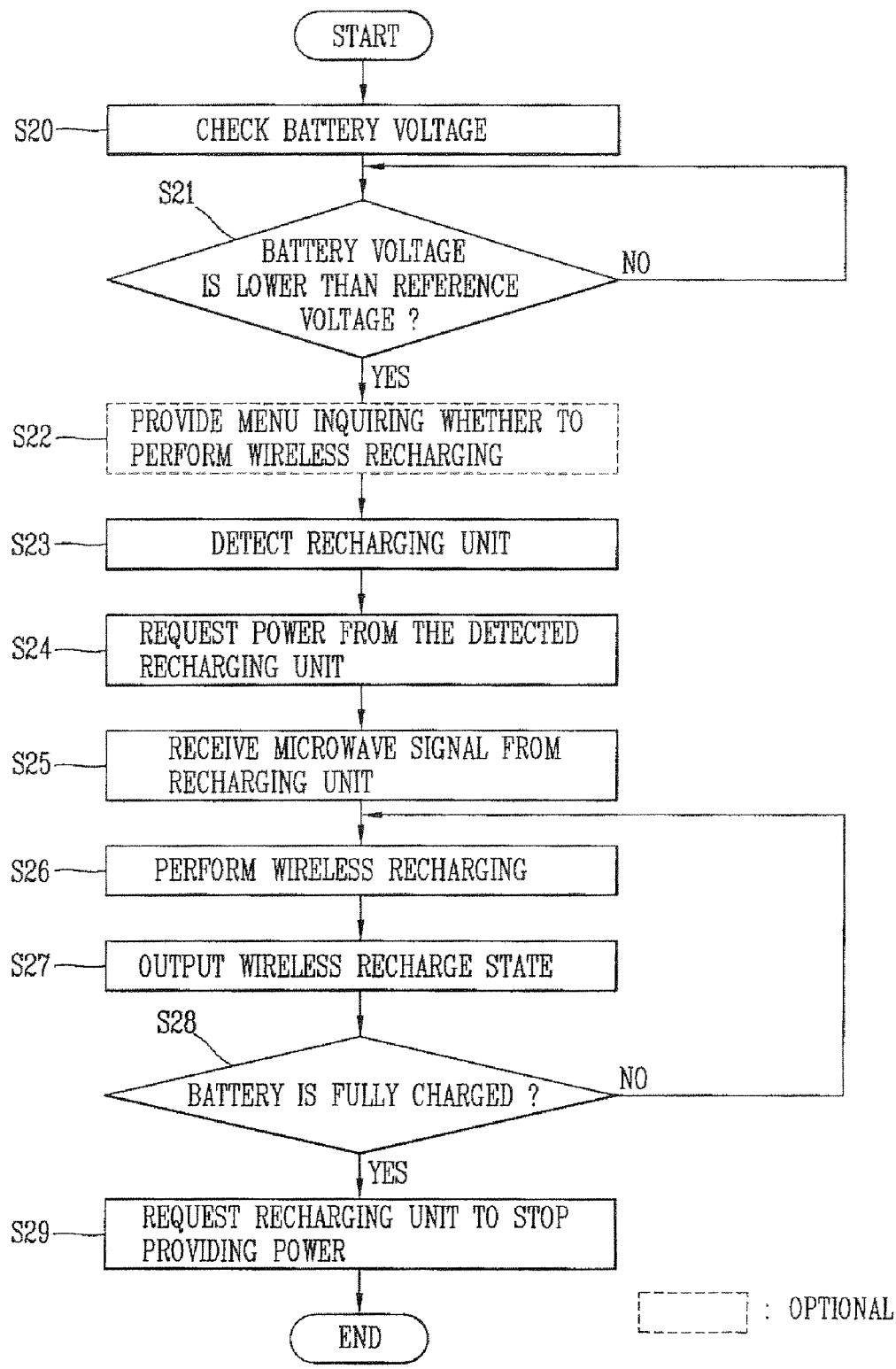
FIG. 7 is a flow chart illustrating a process of a recharging method for free recharging pursuant to a request of a terminal according to an exemplary embodiment of the present invention.

FIG. 7 is a flow chart illustrating the process of a recharging method according to a request of a terminal related to free recharging. As shown in FIG. 7, when the user is home or in an office, the controller 180 periodically checks battery power and compares a battery voltage to the reference voltage (S20, S21). If the battery voltage is lower than the reference voltage, the controller provides a recharge menu (S22) as shown in FIG. 8 inquiring whether to perform wireless recharging (e.g., 'Want to recharge?') or immediately detects the recharge power providing unit (S23).

The recharge menu (S22) is displayed on the screen of the display unit 151 to inform the user about the necessity of recharging. Via the recharge menu, the user may set whether to display the recharge menu and may set the level of the reference voltage. In case of wireless recharging according to a request from the terminal without payment, display of the recharge menu is selectively performed.

The controller 180 provides control to display the remaining battery capacity in a certain color together with the recharge menu using the battery power indicator 50 on the screen of the display unit 151. When the recharge menu is displayed, the user may select the 'OK' key or 'Cancel' key from the recharge menu to select whether to perform recharging.

If the user selects the 'OK' key to start wireless recharging, the controller 180 detects the recharge power providing unit and transmits a power request signal to the detected recharge power providing unit (S23, S24). As shown in FIG. 8, the controller 180 displays an antenna indicator 51 adjacent the battery power indicator 50 to indicate that the recharge power providing unit has been detected, and displays a recharge efficiency of the detected recharge power providing unit using a number of antenna lines. The wireless communication unit 110 receives microwave signals from the detected recharge power providing unit (S25) and recharges the battery under the control of the controller 180 (S26).

An indication such as a sound, character, or an indicator for displaying information indicating the recharge state is set as a default. By default, a recharge level is automatically set as 'full recharge.'

In an exemplary embodiment, the indicator is the battery power indicator 50. While wireless recharging is performed, the controller 180 displays the recharge state in the battery power indicator 50 in a certain color (S27).

Thereafter, if a particular situation occurs, such as a recharge efficiency degradation or if the mobile terminal 100 moves beyond or close to being beyond a range of the recharge power providing unit, the controller 180 informs the user about the situation via the display unit 151, the audio output module 152, and/or the alarm unit 153. That is, the controller 180 informs the user about the degraded efficiency or detected movement out of range through characters, sound, or vibration.

The battery is checked to determine whether it is fully recharged (S28). When the battery is fully recharged, the controller 180 displays the full-charged state in the battery power indicator 50 and transmits a signal requesting the microwave signal transmission be stopped to the recharge power providing unit via the wireless communication unit 110 to terminate the wireless recharging operation (S29).

Recharging with payment (cost-based recharging) refers to recharging performed at a location where payment is required. Because a recharge time (i.e., time needed for the recharge) and a recharge amount (i.e., energy used in the recharge) are directly related to cost, the user is provided with various menus to recharge the battery. The controller 180 controls at least one or more of inquiring from a user whether to perform recharging, allowing a user to select a particular recharge power source providing unit, requesting the user to indicate a desired amount of recharging, and allowing a user to select a recharge state information method.

Figure 9:
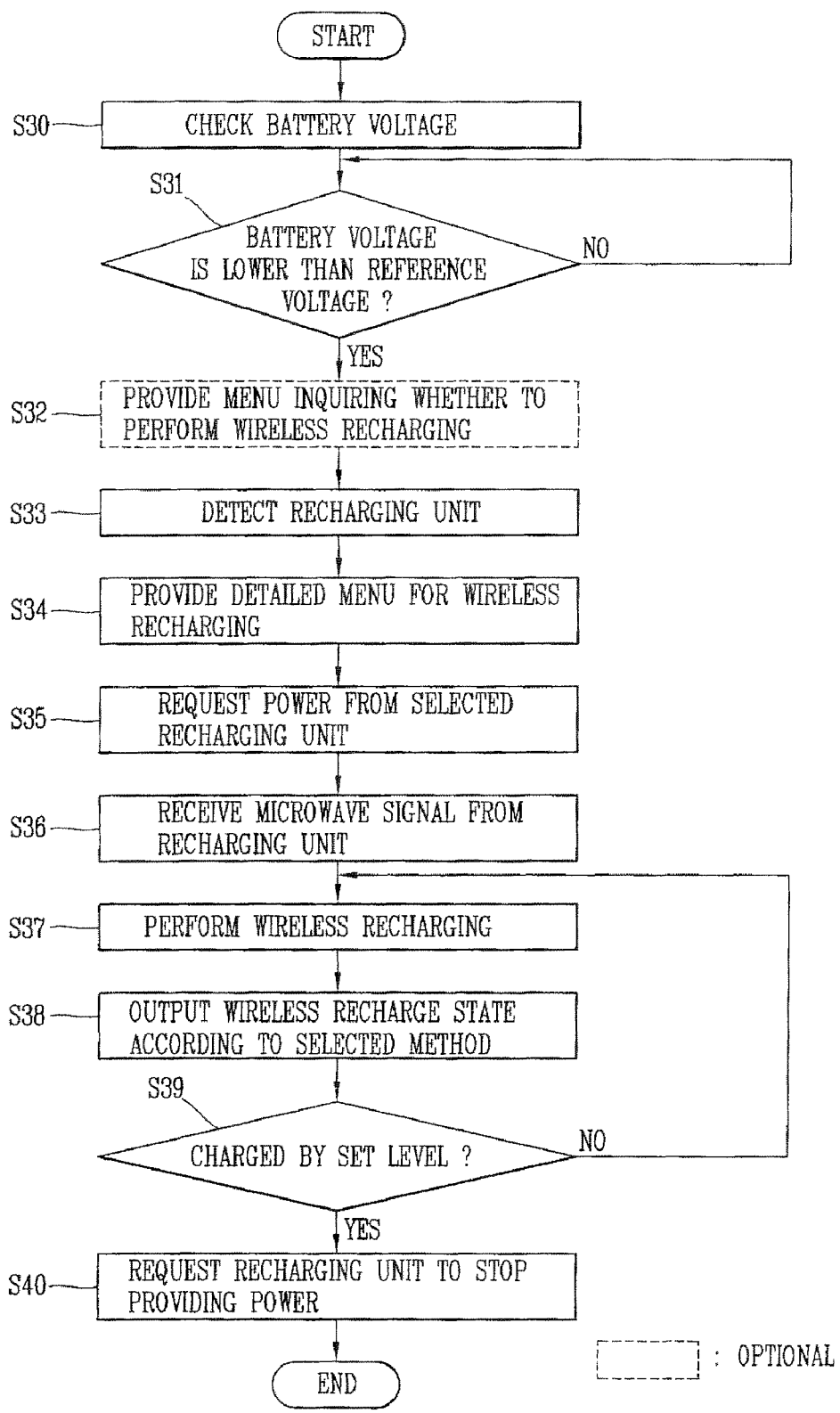
FIG. 9 is a flow chart illustrating a process of a recharging method according to an exemplary embodiment of the present invention in which a mobile terminal starts a recharging operation pursuant to a request of a mobile terminal for paid recharging.

FIG. 9 is a flow chart illustrating the process of a recharging method in which a mobile terminal 100 starts a recharging operation pursuant to a request of a mobile terminal 100 for paid recharging. As shown in FIG. 9, the controller 180 periodically checks battery power and compares the battery voltage to a reference voltage (S30, S31). If the battery voltage is lower than the reference voltage, the controller 180 detects one or more recharge power providing units (S33) and displays a detailed menu for wireless recharging on the screen (S34).

Alternatively, as shown in FIG. 9, a recharge menu, such as a message inquiring whether to perform wireless recharging (e.g., 'Want to recharge?') may be displayed on the screen of the display unit 151 to inform the user about the necessity of recharging (S32). In addition, the controller 180 displays a remaining battery capacity in a certain color on the screen of the display unit 151. Then, the user may select the 'OK' key or 'Cancel' key from the recharge menu to indicate whether to perform recharging.

The detailed menu for wireless recharging includes an item (sound, character, indicator) for selecting a method for indicating a recharge state, an item (strong power, high cost, or free—which may be selected according to priority) for selecting a recharge power providing unit, an item for selecting a recharge amount or recharge level according to usage fee, number of battery indicator icons, or recharge duration, and other items required for wireless recharging.

If the user previously set the recharge power providing unit for providing power to the mobile terminal 100 from the recharge menu, the detailed menu for wireless recharging is provided (S34) before detecting the recharge power providing unit (S33). The controller 180 detects the recharging device previously set from the recharge menu when detecting the recharge power providing unit.

When every desired item is selected from the detailed menu, the user may press the OK key to start wireless recharging. Once wireless recharging starts, the controller 180 transmits a power request signal to the selected recharge power providing unit (S35).

The controller 180 displays the antenna indicator icon 51 adjacent the battery power indicator 50 to indicate that the recharge power providing unit has been detected, and displays a recharge efficiency of the detected recharge power providing unit using a number of antenna lines. The wireless communication unit 110 receives microwave signals from the detected recharge power providing unit (S36) and recharges the battery under the control of the controller 180 (S37).

While wireless recharging is performed, the controller 180 displays the recharge state according to the selected method (number of battery indicator icons, recharge duration, the usage fee) (S38). Thereafter, if a particular situation occurs, such as a recharge efficiency degradation or if the mobile terminal moves close to being beyond or beyond a range of the recharge power providing unit, the controller 180 informs the user about the situation using the display unit 151, the audio output module 152, and/or the alarm unit 153 of the output unit 150. That is, the controller 180 informs the user about the degraded recharge efficiency and the potential movement out of range of the recharge power providing unit through characters, sound, or vibration.

Thereafter, the controller 180 checks whether wireless recharging has been performed to a desired pre-set recharge level (S39). If the wireless recharging has been performed to the desired recharge level, the controller 110 transmits a signal requesting that microwave signal transmission be stopped to the recharge power providing unit via the wireless communication unit 110 to terminate the wireless recharging operation (S40).

Shown in FIG. 9 is an exemplary embodiment in which the mobile terminal 100 determines a recharge time based on the recharge level, but the present invention is not thus limited. Alternatively, the user may start the recharging operation directly at a desired time or may request the mobile terminal to start the recharging operation at a desired time.

Figure 10:
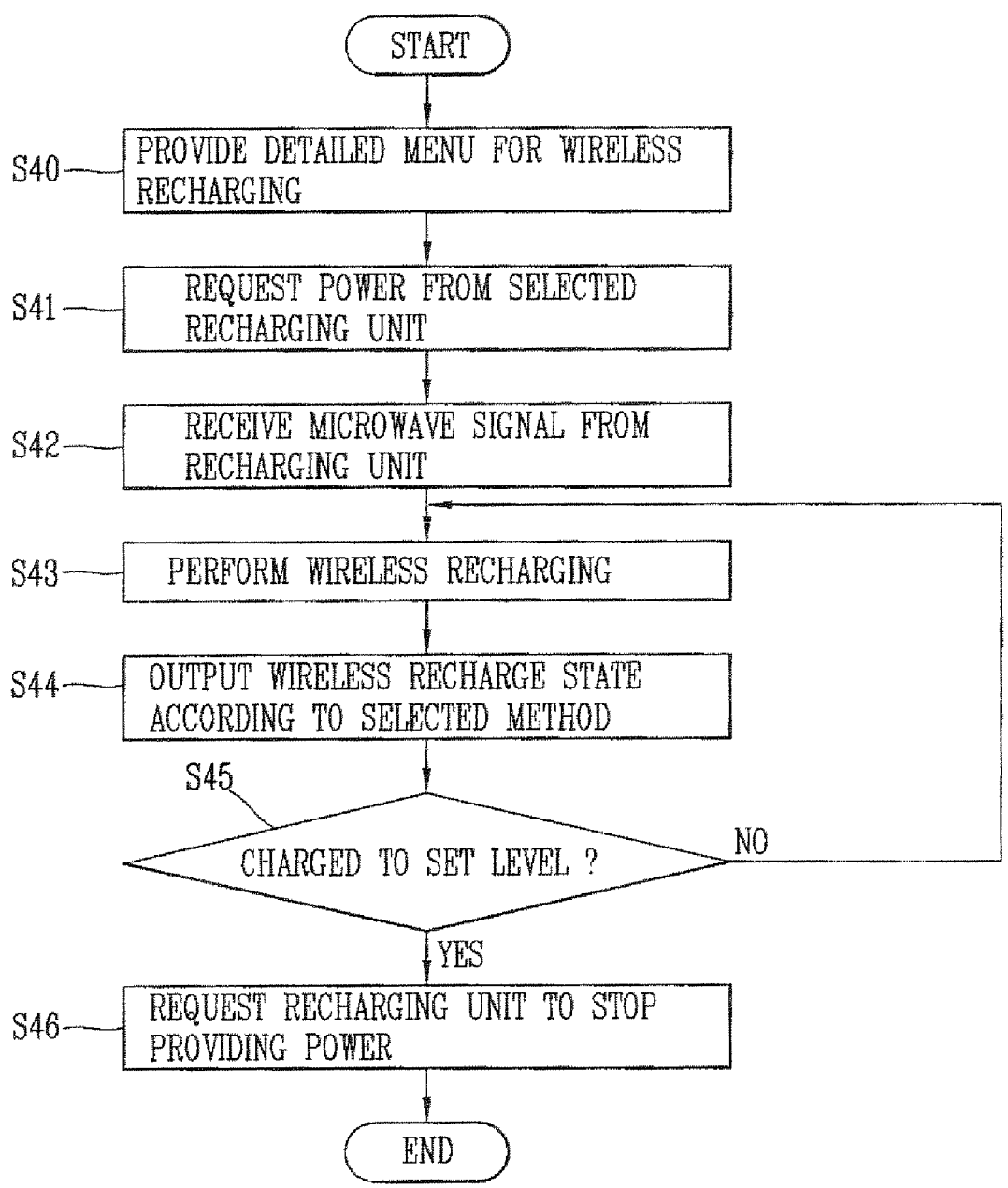
FIG. 10 is another flow chart illustrating the process of a recharging method according to another exemplary embodiment of the present invention in which a mobile terminal starts a recharging operation pursuant to a request of a mobile terminal for paid recharging.

FIG. 10 is another flow chart illustrating the process of a recharging method, in which a mobile terminal 100 starts a recharging operation pursuant to a request of a mobile terminal 100 for paid recharging. As shown in FIG. 10, if the user starts the recharging operation, the user can immediately select the detailed item for wireless recharging from a provided detailed menu (S40) without performing steps S30 to S33 as in FIG. 9. That is, in order to perform wireless recharging, the user may select in the recharge menu a method for indicating a recharge state (sound, character, indicator), the recharge power providing unit (strong power, high cost, or free—which may be selected according to priority), and a recharge amount/level (selected according to usage fee, number of battery indicator icons, recharge duration) (S40).

When every desired item is selected from the detailed menu (S40), the user may press the OK key to start wireless recharging. Once wireless recharging starts, the controller 180 transmits a power request signal to the selected recharge power providing unit (S41). The controller 180 displays the antenna indicator icon 51 adjacent the battery power indicator 50 to indicate that the recharge power providing unit has been detected, and displays a recharge efficiency of the detected recharge power providing unit using a number of antenna lines. The wireless communication unit 110 receives microwave signals from the detected recharge power providing unit (S42) and recharges the battery under the control of the controller 180 (S43).

While wireless recharging is performed, the controller 180 displays the recharge state according to the selected method (number of battery indicator icons, recharge duration, the usage fee) (S44). Thereafter, if a particular situation occurs, such as a recharge efficiency degradation or if the mobile terminal moves beyond or close to being beyond a range of the recharge power providing unit, the controller 180 informs the user about the situation using the display unit 151, the audio output module 152, and/or the alarm unit 153. That is, the controller 180 informs the user about the degraded recharge efficiency and the possibility of moving out of range of the recharge power providing unit through characters, sound, or vibration.

Thereafter, the controller 180 checks whether wireless recharging has been performed to a desired pre-set recharge level (S45). If the wireless recharging has been performed to the desired recharge level, the controller 110 transmits a signal requesting the microwave signal transmission to stop the recharge power providing unit via the wireless communication unit 110 to terminate the wireless recharging operation (S46).

In exemplary embodiments of the present invention, the menus allow the user to select recharge options depending on whether there is a monetary charge/fee for the recharging service. In addition, the wireless recharging is performed according to items selected by the user from the menus, whereby the battery can be recharged to a desired level or to a level defined by a required fee.

In the exemplary embodiments of the present invention, the above-described wireless recharging method can be implemented as codes that can be read by a computer in a program-recorded medium. The computer-readable medium includes various types of recording devices in which data read by a computer system is stored. The computer-readable medium may include a ROM, a RAM, a CD-ROM, a magnetic tape, a floppy disk, and an optical data storage device. The computer-readable medium also includes implementations in the form of carrier waves or signals (e.g., transmission via the Internet). The computer may include the controller 180 of the terminal.

According to exemplary embodiments of the present invention, the menus for selection by a user according to payment/non-payment are provided and wireless recharging is performed according to items selected by the user from the menus, so that user convenience and recharging efficiency can be improved.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal comprising:
   a battery configured for providing power;
   an output unit configured for outputting data;
   a memory configured for storing recharge menus and recharge menu settings; and
   a controller configured for:
      determining whether a remaining battery charge is below a reference voltage;
      determining whether payment is required for wireless recharging of the battery;
      controlling the output unit to display at least one recharge menu of the recharge menus when it is determined that the remaining battery charge is below the reference voltage, wherein the displayed at least one recharge menu is based on whether payment is required for the wireless recharging and whether recharging is requested via the mobile terminal or is performed automatically; and performing a wireless recharging operation based on the recharge menu settings.

2. The mobile terminal of claim 1, wherein the recharge menus are further based on receiving recharge power from a recharge power providing unit wirelessly or receiving recharge power from a wireless recharging unit based on an inductive coupling or a capacitance coupling.

3. The mobile terminal of claim 1, wherein:
the displayed at least one recharge menu comprises one selected from a group comprising an automatic recharge menu and a setting menu when no payment is required for the wireless recharging and the recharging is performed automatically; and
the displayed at least one recharge menu comprises one selected from a group comprising a recharge menu and a setting menu when no payment is required for the wireless recharging and the recharging is requested via the mobile terminal, the setting menu including settings for:
whether to display the recharge menu, and
setting the reference voltage.

4. The mobile terminal of claim 1, wherein the controller is further configured for performing the wireless recharging operation to recharge the battery automatically when the voltage of the battery is below the reference voltage and an option for automatic recharging has been set.

5. The mobile terminal of claim 1, wherein the controller is further configured for providing a notification visually or audibly when the battery charge is below the reference voltage and an option for automatic recharging has been set.

6. The mobile terminal of claim 1, wherein:
the displayed at least one recharge menu comprises one selected from a group comprising a recharge menu and a setting menu when payment is required for the wireless recharging and the recharging is requested via the mobile terminal; and
the setting menu including:
settings for methods for indicating a wireless recharge state;
priority settings for selecting a recharge power providing unit; and
recharging level settings.

7. The mobile terminal of claim 2, wherein the recharge power providing unit comprises a wireless power generator, a base station, a broadcast relay station, a repeater, an Internet sharer, an artificial satellite that wirelessly provides recharge power, or a portable wireless recharging unit that provides recharge power based on the inductive coupling or the capacitance coupling.

8. The mobile terminal of claim 2, wherein the controller is further configured to provide a notification visually, audibly, or through vibration when the recharge power providing unit is positioned within a particular range of the mobile terminal.

9. The mobile terminal of claim 5, wherein the at least one recharge menu is displayed when the notification is provided.

10. The mobile terminal of claim 2, wherein the controller is further configured to provide notification of a wireless recharge state or an event during recharging.

11. The mobile terminal of claim 10, wherein:
the controller is further configured to control the output unit to display the wireless recharge state as a battery power indicator having a certain color; and
the event comprises a degradation of recharge efficiency or the mobile terminal being close to being out of range of the recharge power providing unit.

12. The mobile terminal of claim 6, wherein:
the recharging level is based on a fee, a number of battery indicator icons, or a recharge duration; and
the wireless recharge state is provided by the output unit as a sound, a character, or an indicator.

13. The mobile terminal of claim 12, wherein the indicator is a battery power indicator and the recharging level is indicated via a color.

14. The mobile terminal of claim 2, wherein the controller is further configured to control the output unit to display an antenna indicator icon adjacent a battery power indicator and recharge efficiency represented via a number of antenna lines when the recharge power providing unit is detected.

15. The mobile terminal of claim 1, further
comprising a recharge power providing unit configured for wirelessly providing recharge power.

16. The mobile terminal of claim 15, wherein the recharge power providing unit comprises an antenna configured for checking whether a mobile terminal is within range for wireless recharging.

17. The mobile terminal of claim 16, wherein the recharge power providing unit is further configured for providing recharge related information to the mobile terminal when the mobile terminal is detected by the antenna.

18. The mobile terminal of claim 2, wherein the controller is further configured for controlling reception of recharge power from the recharge power providing unit when the battery charge is below the reference voltage.

19. The mobile terminal of claim 18, wherein the controller is further configured for controlling the output unit to display information provided by the recharge power providing unit and a menu for selecting whether to receive recharge power from the recharge power providing unit when the battery charge is below the reference voltage.

* * * * *